United States Patent Office 3,801,625
Patented Apr. 2, 1974

3,801,625
PROCESS FOR PRODUCTION OF UREA-CARBAMATE HERBICIDES AND INTERMEDIATES THEREFOR
Sanford Tyler Young, Lockport, and Kenneth R. Wilson, Tonawanda, N.Y., assignors to FMC Corporation, New York, N.Y.
No Drawing. Continuation-in-part of abandoned application Ser. No. 782,707, Dec. 10, 1968, which is a continuation-in-part of application Ser. No. 433,157, Feb. 16, 1965, now Patent No. 3,434,822, dated Mar. 25, 1969. This application Nov. 21, 1969, Ser. No. 878,957
Int. Cl. C07c 127/18
U.S. Cl. 260—479 C                              6 Claims

ABSTRACT OF THE DISCLOSURE

An improved process is described for the preparation of m-(di-lower-alkylureido)phenyl N-substituted-lower-alkylcarbamate herbicides from nitrophenol, by the successive steps of carbamoylation of m-nitrophenol to form m-nitrophenyl N-substituted-carbamates, reducing said m-nitrophenyl carbamates to form m-aminophenyl N-substituted-carbamates, reacting these carbamates with phosgene to form m-isocyanatophenyl N-substituted-carbamates, and reacting said m-isocyanatophenyl carbamates with (di-lower-alkyl)amines to form the desired m-(di-lower-alkylureido)phenyl N-substituted-lower-alkylcarbamates. Substantially improved overall yields are obtained by this method of synthesis of the subject herbicides. The details of the synthetic method, and properties of some novel intermediates produced therein, are described.

CROSS REFERENCE TO RELATED APPLICATIONS

This application is a continuation-in-part of copending U.S. patent application Ser. No. 782,707 filed Dec. 10, 1968, now abandoned; which in turn is a continuation-in-part of U.S. patent application Ser. No. 433,157 filed Feb. 16, 1965, now U.S. Pat. No. 3,434,822 issued Mar. 25, 1969.

BACKGROUND OF THE INVENTION

In said U.S. Pat. No. 3,434,822, a series of novel m-ureidophenyl N-substituted-carbamates is described. These ureidophenyl carbamates can be prepared in a variety of ways, as described therein. The then preferred mode of carrying out the invention, exemplified therein in detail, was a multi-step process whereby the appropriate m-ureidophenol was first prepared from m-aminophenol, and then converted to the carbamate. Also suggested in said Pat. No. 3,434,822 was the alternative approach of first preparing the carbamate from the m-nitrophenol, and converting that intermediate to the desired ureidophenyl compound. We have now discovered that this alternative approach, although less conventional, results in substantial improvements in the overall yields obtainable in the synthesis of the subject herbicides.

SUMMARY OF THE INVENTION

This invention relates to an improved process for the synthesis of m-(di-lower-alkylureido)phenyl N-substituted-lower alkylcarbamate herbicides from m-nitrophenol, in higher overall yields than previously available. This novel reaction sequence comprises the successive steps of (a) carbamoylation of m-nitrophenol to form a m-nitrophenyl N-substituted-lower-alkylcarbamate, (b) reducing said m-nitrophenyl carbamate to form the corresponding m-aminophenyl N-substituted-lower-alkylcarbamate, (c) reacting the said m-aminophenyl carbamate with phosgene to form the corresponding m-isocyanatophenyl N-substituted-lower-alkylcarbamate, and (d) reacting this m-isocyanatophenyl carbamate with a (di-lower-alkyl)amine to form the corresponding m-(di-lower-alkylureido)phenyl N - substituted-lower-alkylcarbamate.

DESCRIPTION OF THE PREFERRED EMBODIMENTS

The process of this invention is illustrated in the following examples, which are presented as illustration and not as limitation. All temperatures are in degrees centigrade.

Example 1.—Preparation of m-(3,3-dimethylureido) phenyl N,N-dimethylcarbamate

Step 1: Preparation of m-nitrophenyl N,N-dimethylcarbamate.—A solution of 132.1 g. of m-nitrophenol in 500 ml. of dioxane was added dropwise with stirring to a mixture of 51 g. of sodium hydride in 500 ml. of dioxane, and to this mixture 136.5 g. of dimethylcarbamoyl chloride was added. The reaction was heated at 60–65° for two hours. The warm reacted mixture was slowly poured into 5 l. of ice water. The precipitated product was filtered from the mother liquor, dried and recrystallized from a methanol-water system to yield 171 g. (86%) of crystalline m-nitrophenyl N,N-dimethylcarbamate, M.P. 59–61.5°.

Step 2: Preparation of m-aminophenyl N,N-dimethylcarbamate.—m - Nitrophenyl N,N - dimethylcarbamate (31.5 g.) was hydrogenated in the presence of 0.1 g. of platinum oxide in 200 ml. of ethyl acetate in a Parr Hydrogenation Apparatus. The catalyst was filtered from the solution. This procedure was repeated and the ethyl acetate solutions were combined. The combined solutions were dried over magnesium sulfate, filtered and evaporated in vacuo to an oil. The resultant oil was washed with hexane, and the product crystallized. The product was purified by recrystallization from a benzene-hexane system to yield 43 g. (80%) of crystalline m-aminophenyl N,N-dimethylcarbamate, M.P. 87–89°.

Step 3: Preparation of m-isocyanatophenyl N,N-dimethylcarbamate.—To 100 ml. of ethyl acetate was added 19.8 g. of phosgene and, while phosgene continued to bubble through the saturated solution, 36 g. of m-aminophenyl N,N-dimethylcarbamate in 400 ml. of ethyl acetate was slowly added. The temperature of the mixture was maintained at 25–30° during the addition. The reaction mixture was slowly warmed to remove excess phosgene, and then refluxed for eight hours to remove excess hydrogen chloride. The mixture was then evaporated in vacuo to obtain an oil of low viscosity. Infrared spectroscopy confirmed the product to be m - isocyanatophenyl N,N-dimethylcarbamate. A 98% yield was obtained.

Step 4: Preparation of m-(3,3-dimethylureido)phenyl N,N-dimethylcarbamate.—In a 250-ml. three-neck flask equipped with a condenser, thermometer, gas insert tube and magnetic stirrer was placed 40.1 g. of m-isocyanatophenyl N,N-dimethylcarbamate in 200 ml. of ethyl acetate. This mixture was stirred at 25–30° while 9.0 g. of dimethylamine was bubbled into the mixture. The reacted mixture was filtered, and evaporated in vacuo to give a white solid. This solid was slurried in 500 ml. of water and recrystallized from toluene, M.P. 122.5–123.5°. Infrared spectroscopy confirmed the product as m-(3,3-dimethylureido)phenyl N,N-dimethylcarbamate. A 85% yield was obtained.

In the above reaction sequence, an overall yield of 58% was obtained. When m-(3,3-dimethylureido)phenyl N,N-dimethylcarbamate was prepared by the more conventional method described in U.S. Pat. No. 3,434,822, the overall yield was 41%, obtained as follows: reduction of m-nitrophenol to m-aminophenol (90% yield); reaction of m-aminophenol with dimethylcarbamoyl chloride to produce 3-(m-hydroxyphenyl) - 1,1 - dimethylurea (67% yield); reaction of 3-(m-hydroxyphenyl)-1,1-dimethylurea with dimethylcarbamoyl chloride to produce m-(3,3-dimethylureido)phenyl N,N, - dimethylcarbamate (67% yield). Thus, the overall yield obtained by the process of this invention is seen to be substantially better than that of the more conventional process. This result is of significant economic and commercial importance.

Example 2.—Preparation of m-(3,3-dimethylureido) phenyl N-isopropylcarbamate

Step 1: Preparation of m-nitrophenyl N-isopropylcarbamate.—A solution of 69.6 g. of m-nitrophenol and 5.0 g. of triethylamine in 200 ml. of dimethylformamide was prepared, and 46.9 g. of isopropyl isocyanate was added, dropwise, with stirring. During addition the temperature of the reaction mixture was maintained at 25–30°. The reaction mixture was then heated at 55–60° for one hour, after which it was cooled and poured into about 500 ml. of ice water. The precipitated product was collected by filtration and dissolved in hot methanol. The product was precipitated from methanol by addition of water, to yield 56 g. (50%) of crystalline m-nitrophenyl N-isopropylcarbamate, M.P. 98–99°.

Analysis.—Calc'd for $C_{10}H_{12}N_2O_4$ (percent): C, 53.57; H, 5.39; N, 12.50. Found (percent): C, 53.73; H, 5.58; N, 12.25.

Step 2: Preparation of m-aminophenyl N-isopropylcarbamate.—m-Nitrophenyl N-isopropylcarbamate (26 g.) in 100 ml. of ethyl acetate was reduced in a Parr Hydrogenation Apparatus, in the presence of 0.1 g. of platinum oxide. The catalyst was filtered from the reaction mixture. This procedure was repeated and the ethyl acetate solutions were combined. The combined solutions were dried over magnesium sulfate, filtered and evaporated in vacuo to an oil, which crystallized. There was obtained 42.3 g. (94%) of crystalline m-aminophenyl N-isopropylcarbamate; M.P. 120–121°.

Analysis.—Calc'd for $C_{10}H_{14}N_2O_2$ (percent): C, 61.83; H, 7.27; N, 14.42. Found (percent): C, 62.01; H, 7.29; N, 14.22.

Step 3: Preparation of m-isocyanatophenyl N-isopropylcarbamate.—To 150 ml. of ethyl acetate was added 22 g. of phosgene and while phosgene continued to bubble through the solution a solution of 42.2 g. of m-aminophenyl N-isopropylcarbamate in 500 ml. of ethyl acetate was slowly added. The temperature of the mixture was maintained at 25–30° during the addition. The reaction mixture was stirred at room temperature for an additional one half hour, and then slowly warmed to reflux temperature to remove excess phosgene. The mixture was refluxed until hydrogen chloride evolution ceased. The reacted mixture was then evaporated in vacuo to obtain a solid product, which melted at 114–118°. The identity of the product as m-isocyanatophenyl N-isopropylcarbamate was confirmed by infrared spectroscopy. The yield was 48.0 g. 100% of the theoretical yield.

Step 4: Preparation of m-(3,3-dimethylureido)phenyl N-isopropylcarbamate.—Following the procedure of Example 1, Step 4, 11.0 g. of m-isocyanatophenyl N-isopropylcarbamate was reacted with 2.3 g. of dimethylamine to yield 11.5 g. of m-(3,3-dimethylureido)phenyl N-isopropylcarbamate (87%), M.P. 152–154°. The identity of the compound was confirmed by nuclear magnetic resonance and infrared spectroscopy.

In the above reaction sequence, an overall yield of 41% was obtained. When m-(3,3-dimethylureido)phenyl N-isopropylcarbamate was prepared by the more conventional method described in U.S. Pat. No. 3,434,822, the overall yield was 1.8%, obtained as follows: The reduction of m-nitrophenol to m-aminophenol (90% yield); reaction of m-aminophenol with dimethylcarbamoyl chloride to produce 3-(m-hydroxyphenyl)-1,1-dimethylurea (67% yield); reaction of 3-(m-hydroxyphenyl)-1,1-dimethylurea with isopropyl isocyanate to produce m-(3,3-dimethylureido)phenyl N-isopropylcarbamate (3% yield).

The yield obtained in the process of this invention is obviously superior to that previously obtained, primarily due to the avoidance of the carbamoylation reaction of the final step, which occurs in very poor yield.

Example 3.—Preparation of m-(3,3-dimethylureido)phenyl N-tert-butylcarbamate

Step 1: Preparation of m-nitrophenyl N-tert-butylcarbamate.—A mixture of 1000.8 g. of m-nitrophenol and 785 g. of tert-butyl isocyanate was reacted in the presence of 80.6 g. of 1,4-diazabicyclo(2.2.2)octane at 50–55° for about two hours. The reaction mixture was diluted with one liter of methanol, stirred for one hour, filtered and the resulting filtrate diluted with 2 l. of methanol. The product was purified from a methanolic solution with water to yield 1404 g. (82%) of crystalline product, M.P. 72–75°. Infrared spectroscopy confirmed the identity of the product to be m-nitrophenyl N-tert-butylcarbamate.

Step 2: Preparation of m-aminophenyl N-tert-butylcarbamate.—m-Nitrophenyl N-tert-butylcarbamate (23.8 g.) in 200 ml. of ethyl acetate was reduced in a Parr Hydrogenation Apparatus in the presence of 0.1 g. of platinum oxide. The catalyst was filtered from the solution. This procedure was repeated and the ethyl acetate solutions were combined. The combined solutions were dried over magnesium sulfate, filtered and evaporated in vacuo to an oil. The product was purified by recrystallization from a benzene-hexane system and yielded 32.5 g. (78% yield) of product, M.P. 94–96°. Infrared spectroscopy confirmed the compound to be m-aminophenyl N-tert-butylcarbamate.

Step 3: Preparation of m-isocyanatophenyl N-tert-butylcarbamate.—To 150 ml. of ethyl acetate was added 13.82 g. of phosgene and while phosgene continued to bubble through the saturated solution 30.0 g. of m-aminophenyl N-tert-butylcarbamate in 400 ml. of ethyl acetate was slowly added. Temperature of the mixture was maintained at 25–30° during the addition. The mixture was then slowly warmed to reflux to remove excess phosgene and hydrogen chloride. The resultant solution was evaporated in vacuo to yield 32.2 g. (95%) of an oil which crystallized, M.P. 80–88°. Identity of the compound as m-isocyanatophenyl N-tert-butylcarbamate was confirmed by infrared spectroscopy.

Step 4: Preparation of m-(3,3-dimethylureido)phenyl N-tert-butylcarbamate.—Following the procedure outlined in Step 4 of Example 1, 11.7 g. of m-isocyanatophenyl N-tert-butylcarbamate was reacted with 2.3 g. of dimethylamine to yield 11.8 g. (84%) of m-(3,3-dimethylureido) phenyl N - tert - butylcarbamate, M.P. 179.5–180.5°. Identity of the compound was confirmed by infrared spectroscopy.

Thus in the above reaction sequence an overall yield of 51% was obtained. When m-(3,3-dimethylureido)phenyl N-tert-butylcarbamate was prepared by the more conventional method described in U.S. Pat. No. 3,434,822, the overall yield was 31%, obtained as follows: reduction of m-nitrophenol to m-aminophenol (90% yield); reaction of m-aminophenol with dimethylcarbamoyl chloride to produce 3-(m-hydroxyphenyl)-1,1-dimethylurea (67% yield); reaction of 3-(m-hydroxyphenyl)-1,1-dimethylurea with tert-butyl isocyanate to produce m-(3,3-dimethylureido)phenyl N-tert-butylcarbamate (51% yield). The yield obtained by the process of this invention is seen to be substantially better than that obtained by the prior process.

Within the novel reaction sequence of this invention, certain modifications and improvements may be made in the individual steps without departing from the inventive concept thereof.

Thus, the reaction of m-nitrophenol with carbamate-forming reactants may be carried out by standard procedures. For example, N-monosubstituted-carbamates may be prepared by reacting m-nitrophenol with the appropriate alkyl isocyanate, by standard procedures. A catalyst may be present, such as triethylamine, 1,4-diazabicyclo(2.2.2)octane, dibutyltin diacetate and dimethyltin dichloride. The reaction may be carried out in a suitable solvent medium such as dimethylformamide, toluene, xylene or benzene. N,N-Disubstituted-carbamates may be prepared from the alkali metal salt of m-nitrophenol, by reaction of said salt with the appropriate N,N-disubstituted carbamoyl halide. Mono- and di-substituted-carbamates may also be prepared by converting m-nitrophenol to its chloroformic acid ester by treatment with phosgene, then reacting the chloroformate with a primary or secondary amine.

In the next step of the reaction sequence, the intermediate m-aminophenyl mono- or di-substituted carbamates are obtained by reduction of the corresponding m-nitrophenyl carbamates. Conventional hydrogenation catalysts may be used for this reaction, particularly useful catalysts are palladium and platinum. The reaction may be carried out at atmospheric or elevated pressure. If a closed reaction system is used, superatmospheric pressure is generally employed.

In the third step, m-isocyanatophenyl mono- or di-substituted carbamates are obtained by treatment of a m-aminophenyl N-substituted carbamate with phosgene. The reaction may be carried out by first saturating a suitable solvent with phosgene, then introducing the aminophenyl carbamate while maintaining phosgene in excess. The reaction takes place smoothly at temperatures between 0 and 40°, and preferably at temperatures between 25 and 30°.

The m - isocyanatophenyl N - substituted carbamate is then treated with an appropriate primary or secondary amine, normally in the presence of a suitable solvent, to produce the desired M-(di-lower alkylureido)phenyl N-substituted-lower-alkylcarbamate. The selection of the reactants and conditions for the synthesis of any specific compound of this invention will depend of course upon the structure of the final compound desired.

The products of this improved process are useful herbicides, as described in U.S. Pat. No. 3,434,822.

We claim:
1. In the preparation of m-(di-lower-alkylureido)-phenyl N - substituted - lower - alkylcarbamates from m-nitrophenol, the improved process which comprises the steps of
   (a) carbamoylating m-nitrophenol to form a m-nitrophenyl N-substituted-lower-alkylcarbamate,
   (b) reducing said m-nitrophenyl carbamate to form a m-aminophenyl N-substituted-lower-alkylcarbamate,
   (c) reacting said m-aminophenyl carbamate with phosgene to form a m-isocyanatophenyl N-substituted-lower-alkylcarbamate, and
   (d) reacting said m-isocyanatophenyl carbamate with a (di-lower-alkyl)amine to form a m-(di-lower-alkylureido)phenyl N-substituted-lower-alkylcarbamate.
2. In the preparation of m-(3,3-dimethylureido)phenyl N-isopropylcarbamate from m-nitrophenol, the improved process which comprises the step of
   (a) carbamoylating m-nitrophenol with isopropyl isocyanate to form m-nitrophenyl N-isopropylcarbamate,
   (b) hydrogenating m-nitrophenyl N-isopropylcarbamate to form m-aminophenyl N-isopropylcarbamate,
   (c) reacting m-aminophenyl N-isopropylcarbamate with phosgene to form m-isocyanatophenyl N-isopropylcarbamate, and
   (d) reacting m-isocyanatophenyl isopropylcarbamate with dimethylamine to form m-(3,3-dimethylureido)-phenyl N-isopropylcarbamate.
3. In the preparation of m-(3,3-dimethylureido)phenyl N-tert-butylcarbamate from m-nitrophenol, the improved process which comprises the steps of
   (a) reacting m-nitrophenol with N-tert-butyl isocyanate to form m-nitrophenyl N-tert-butylcarbamate,
   (b) hydrogenating m-nitrophenyl N-tert-butylcarbamate to form m-aminophenyl N-tert-butylcarbamate,
   (c) reacting m-aminophenyl N-tert-butylcarbamate with phosgene to form m-isocyanatophenyl N-tert-butylcarbamate, and
   (d) reacting m-isocyanatophenyl N-tert-butylcarbamate with dimethylamine to form m-(3,3-dimethylureido)-phenyl N-tert-butylcarbamate.
4. The compound m-isocyanatophenyl N,N-dimethylcarbamate.
5. The compound m - isocyanatophenyl N - isopropylcarbamate.
6. The compound m-isocyanatophenyl N-tert-butylcarbamate.

References Cited
UNITED STATES PATENTS

| | | | |
|---|---|---|---|
| 3,404,975 | 10/1968 | Wilson et al. | 260—479 |
| 3,434,822 | 3/1969 | Wilson et al. | 260—479 |
| 3,547,979 | 12/1970 | Brantley | 260—479 |

FOREIGN PATENTS 661,399   9/1965   Belgium.

JAMES A. PATTEN, Primary Examiner